United States Patent
Chen et al.

(10) Patent No.: US 10,839,192 B2
(45) Date of Patent: Nov. 17, 2020

(54) DISPLAY PANEL AND DISPLAY DEVICE

(71) Applicant: Shanghai Tianma AM-OLED Co., Ltd., Shanghai (CN)

(72) Inventors: Xian Chen, Shanghai (CN); Xingxing Yang, Shanghai (CN); Lijing Han, Shanghai (CN); Chunpeng Zhang, Shanghai (CN); Yongzhi Wang, Shanghai (CN); Tao Peng, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 92 days.

(21) Appl. No.: 16/124,465

(22) Filed: Sep. 7, 2018

(65) Prior Publication Data
US 2019/0377923 A1    Dec. 12, 2019

(30) Foreign Application Priority Data
Jun. 8, 2018 (CN) .......................... 2018 1 0584244

(51) Int. Cl.
G06K 9/00 (2006.01)
G09G 3/3225 (2016.01)
G09G 3/3266 (2016.01)

(52) U.S. Cl.
CPC ......... G06K 9/0004 (2013.01); G09G 3/3225 (2013.01); G09G 3/3266 (2013.01); G06K 9/001 (2013.01); G09G 2300/0426 (2013.01); G09G 2300/0809 (2013.01)

(58) Field of Classification Search
CPC ... G06K 9/0004; G09G 3/3225; G09G 3/3266
See application file for complete search history.

(56) References Cited

U.S. PATENT DOCUMENTS

| | | | | |
|---|---|---|---|---|
| 9,460,331 | B2 * | 10/2016 | Du | G06K 9/00033 |
| 2004/0252867 | A1 * | 12/2004 | Lan | G06K 9/0004 382/124 |
| 2016/0292487 | A1 * | 10/2016 | Sun | G06K 9/0002 |
| 2017/0147850 | A1 * | 5/2017 | Liu | G06K 9/0002 |
| 2018/0158417 | A1 * | 6/2018 | Xiang | G09G 3/3233 |

(Continued)

FOREIGN PATENT DOCUMENTS

CN    107194321 A    9/2017

*Primary Examiner* — Utpal D Shah
(74) *Attorney, Agent, or Firm* — Tarolli, Sundheim, Covell & Tummino LLP

(57) ABSTRACT

The present disclosure provides a display panel and a display device. The display panel has a display area and non-display area. The display panel includes a plurality of display units arranged in an array within the display area; and a plurality of pixel driving circuits correspondingly connected to the plurality of display units. The display area includes a fingerprint recognition region. The plurality of display units disposed within the fingerprint recognition region includes at least one first display unit. The plurality of pixel driving circuits includes at least one first pixel driving circuit electrically connected to the at least one first display unit. Each of the at least one first pixel driving circuit includes a storage capacitor and a plurality of thin film transistors. The storage capacitor and/or at least one of the plurality of thin film transistors are located within the non-display area.

19 Claims, 8 Drawing Sheets

(56) References Cited

U.S. PATENT DOCUMENTS

| | | | | |
|---|---|---|---|---|
| 2018/0173349 A1* | 6/2018 | Cho | ................... | G06F 3/042 |
| 2018/0211088 A1* | 7/2018 | Cho | ................... | G06K 9/22 |
| 2018/0330137 A1* | 11/2018 | Moon | ................ | G06F 3/0412 |
| 2019/0080133 A1* | 3/2019 | Zhang | ............... | G06K 9/0002 |
| 2019/0087628 A1* | 3/2019 | Choe | ................ | G06K 9/0004 |
| 2019/0326367 A1* | 10/2019 | Jung | ................. | G06F 3/0412 |
| 2020/0034598 A1* | 1/2020 | Wu | ................... | G06K 9/0004 |
| 2020/0104562 A1* | 4/2020 | Sung | ................. | H01L 31/12 |

* cited by examiner

DISPLAY PANEL AND DISPLAY DEVICE

CROSS-REFERENCE TO RELATED APPLICATIONS

The present disclosure claims priority to Chinese Patent Application No. 201810584244.7, filed on Jun. 8, 2018, the content of which is incorporated herein by reference in its entirety.

TECHNICAL FIELD

The present disclosure relates to the field of display technologies, and in particular, to a display panel and a display device.

BACKGROUND

In recent years, along with the continuous development of display technologies, there are more and more display devices that use fingerprint recognition to achieve user privacy protection. When a user operates a display device with the fingerprint recognition function, the user can achieve the authority verification by only touching the display screen with a finger, and the operation is simple.

When the existing display panel with the fingerprint recognition function performs fingerprint recognition, light emitted from a light source is reflected by a touching body and then gets into a fingerprint recognition unit, which in turn recognizes different fingerprints according to the difference in the reflected light intensity of the ridge-valley of the fingerprints. However, based on the structure of the existing display panel, the light reflected by the touching body has a low transmittance within the display panel, resulting in a small amount of light getting into the fingerprint recognition unit and thereby affecting the fingerprint recognition accuracy.

SUMMARY

The present disclosure provides a display panel and a display device, which are used to solve the problem of the low fingerprint recognition accuracy in the related art.

In one aspect, the present disclosure provides a display panel, and the display panel has a display area and a non-display area. The display panel includes a plurality of display units arranged in an array within the display area; and a plurality of pixel driving circuits, each of which is connected to a respective one of the plurality of display units. The display area includes a fingerprint recognition region. At least one of the plurality of display units is disposed within the fingerprint recognition region and includes at least one first display unit; and the plurality of pixel driving circuits includes at least one first pixel driving circuit electrically connected to the at least one first display unit. Each of the at least one first pixel driving circuit includes a storage capacitor and a plurality of thin film transistors. The storage capacitor and/or at least one of the plurality of thin film transistors are located within the non-display area.

In another aspect, the present disclosure provides a display device, and the display device includes the abovementioned display panel.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. Obviously, the drawings described as follows are merely part of the embodiments of the present disclosure, other drawings can also be acquired by those skilled in the art without paying creative efforts.

DESCRIPTION OF EMBODIMENTS

For better illustrating technical solutions of the present disclosure, embodiments of the present disclosure will be described in detail as follows with reference to the accompanying drawings.

It should be noted that the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "I" herein generally indicates that the related objects before and after the character form an "or" relationship.

It should be understood that although the pixel driving circuit may be described using the terms of "first", "second", etc., in the embodiments of the present disclosure, the pixel driving circuit will not be limited to these terms. These terms are merely used to distinguish pixel driving circuits from one another. For example, without departing from the scope of the embodiments of the present disclosure, a first pixel driving circuit may also be referred to as a second pixel driving circuit, similarly, a second pixel driving circuit may also be referred to as a first pixel driving circuit.

Figure 1:
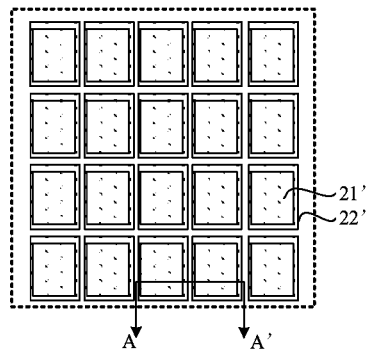
FIG. 1 is a schematic diagram of a part of a fingerprint recognition region of a display panel in the related art.
Figure 2:
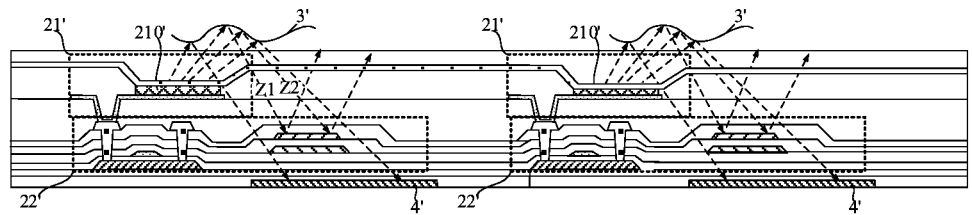
FIG. 2 is a schematic cross-sectional view along line AA' of FIG. 1.

As shown in FIG. 1 and FIG. 2, FIG. 1 is a schematic diagram of a part of a fingerprint recognition region of a display panel in the related art, and FIG. 2 is a schematic cross-sectional view along line AA' of FIG. 1. A pixel unit located within the fingerprint recognition region includes display units 21' and driving circuits 22'. Here, the display units 21' correspond to the drive circuits 22' in one-to-one correspondence, and a projection of one display unit 21' on a plane of the display panel overlaps with a projection of a corresponding drive circuit 22' on the plane of the display panel. As shown in FIG. 2, in the fingerprint recognition process, light emitted from a light source 210' reaches a touching body 3', and then the light is reflected by the touching body 3' and gets into a fingerprint recognition unit 4'. The fingerprint recognition unit 4' determines valley(s) and ridge(s) of the fingerprint according to the light intensity so as to complete the fingerprint recognition process. However, most components of the driving circuit 22' are made of materials having a low light transmittance. As a result, a large amount of light reflected by the touching body 3' may be blocked by the driving circuit 22' on its way to the fingerprint recognition unit 4' (as shown by the light transmitting along the direction Z1 and the direction Z2 in FIG. 2), thereby resulting in less light getting into the fingerprint recognition unit 4' and thus reducing the fingerprint recognition accuracy.

Figure 3:
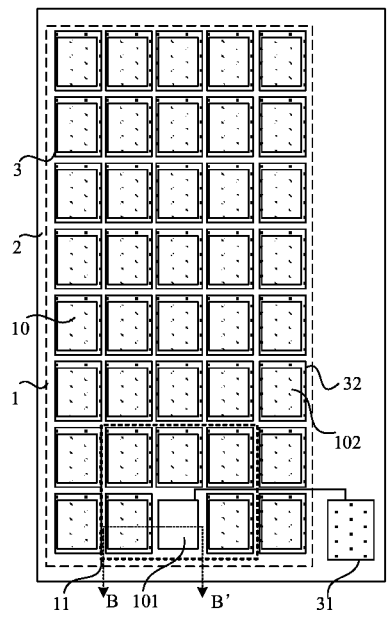
FIG. 3 is a top view of a display panel according to an embodiment of the present disclosure.

In view of this, an embodiment of the present disclosure provides a display panel. As shown in FIG. 3, which is a top view of a display panel according to an embodiment of the present disclosure, the display panel includes a display area 1 and a non-display area 2. The display area 1 includes a fingerprint recognition region 11. A plurality of display units 10 arranged is provided in the display area 1 and is arranged in an array. A plurality of pixel driving circuits 3 is provided in the display area 1, and is correspondingly connected to the display units 10.

As shown in FIG. 3, the display units 10 located within the fingerprint recognition region 11 include at least one first display unit 101, and the pixel driving circuits 3 include at least one first pixel driving circuit 31 electrically connected to the first display unit 101.

Figure 4:
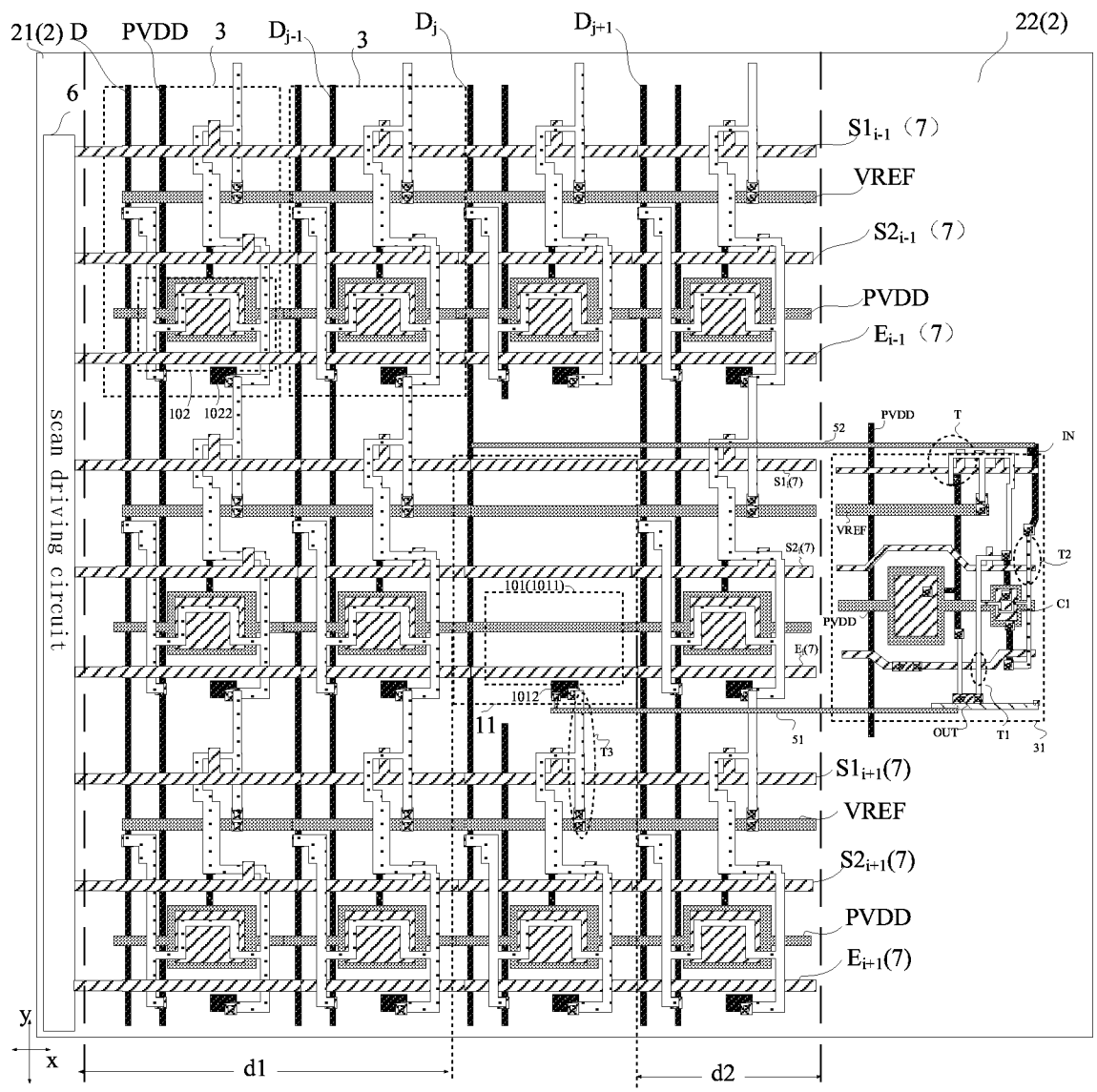
FIG. 4 is an enlarged schematic diagram of a partial region of FIG. 3.

As shown in FIG. 4, which is an enlarged schematic diagram of a partial region of FIG. 3, the first pixel driving circuit 31 includes a storage capacitor C1 and a plurality of thin film transistors T. The storage capacitor C1 and/or at least one thin film transistor T are located within the non-display area 2, and the first display unit 101 is located within the fingerprint recognition region 11.

In this embodiment of the present disclosure, the storage capacitor C1 and/or at least one thin film transistor T of the first pixel driving circuit 31 electrically connected to the first display unit 101 are located within the non-display area 2, and the first display unit 101 is located within the fingerprint recognition region 11. That is, compared with the related art, in this embodiment of the present disclosure, at least partial components of the first pixel driving circuit 31 move from the fingerprint recognition region 11 to the non-display area 2. In this way, the light-blocking area in the fingerprint recognition region can decrease, and thus in the fingerprint recognition process, a reduced amount of light reflected by the fingerprint will be blocked on its way to the fingerprint recognition unit. Therefore, compared with the related art, with the display panel provided by this embodiment of the present disclosure, the amount of light that is blocked in the fingerprint recognition process and thus does not get into the fingerprint recognition unit can decrease to some extent, and thus the amount of light received by the fingerprint recognition unit can be increased, thereby improving the fingerprint recognition accuracy.

In an embodiment, as shown in FIG. 4, the display panel provided by this embodiment of the present disclosure further includes a plurality of data lines D arranged along a first direction x and extending along a second direction y. Here, the first direction x is different from the second direction y. Each data line D is electrically connected to pixel drive circuits 3 corresponding to a respective one column of display units 10. The first display unit 101 includes an anode 1011, a light-emitting layer, and a cathode (the light-emitting layer and the cathode are not shown) that are stacked.

Figure 5:
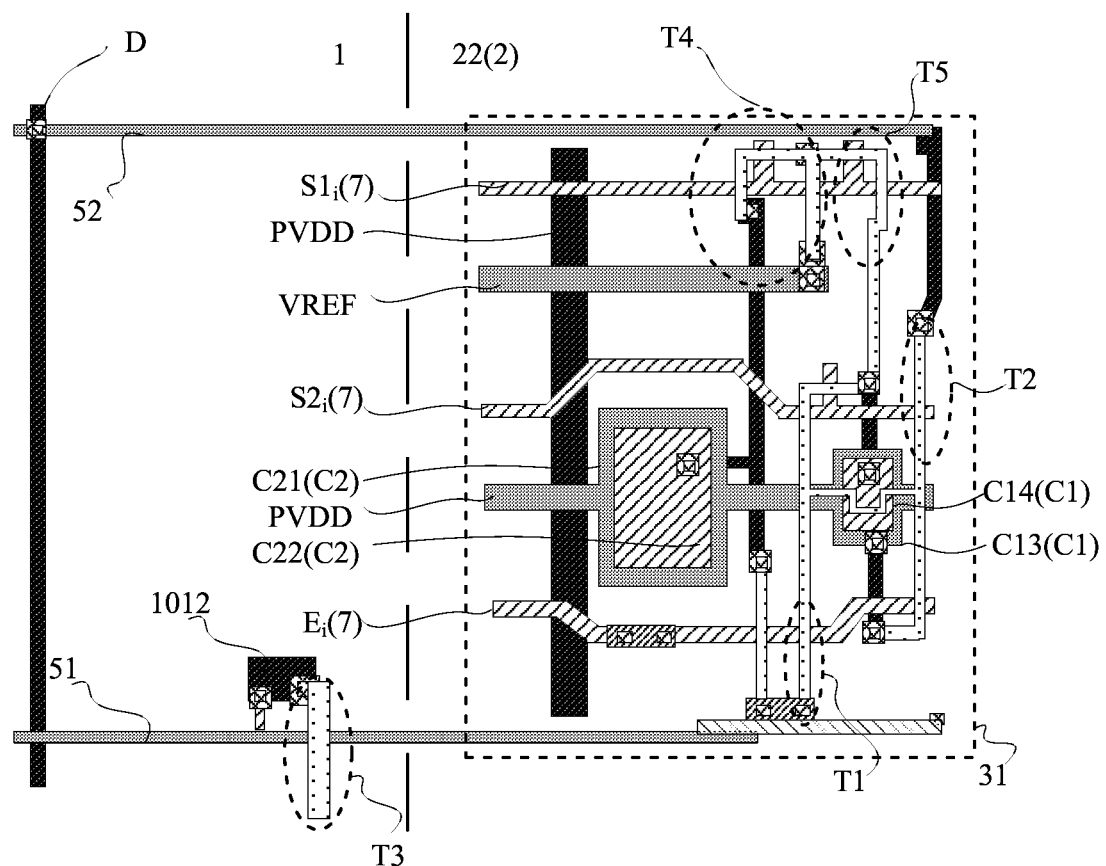
FIG. 5 is a schematic diagram of a wiring of a first pixel driving circuit according to an embodiment of the present disclosure.
Figure 6:
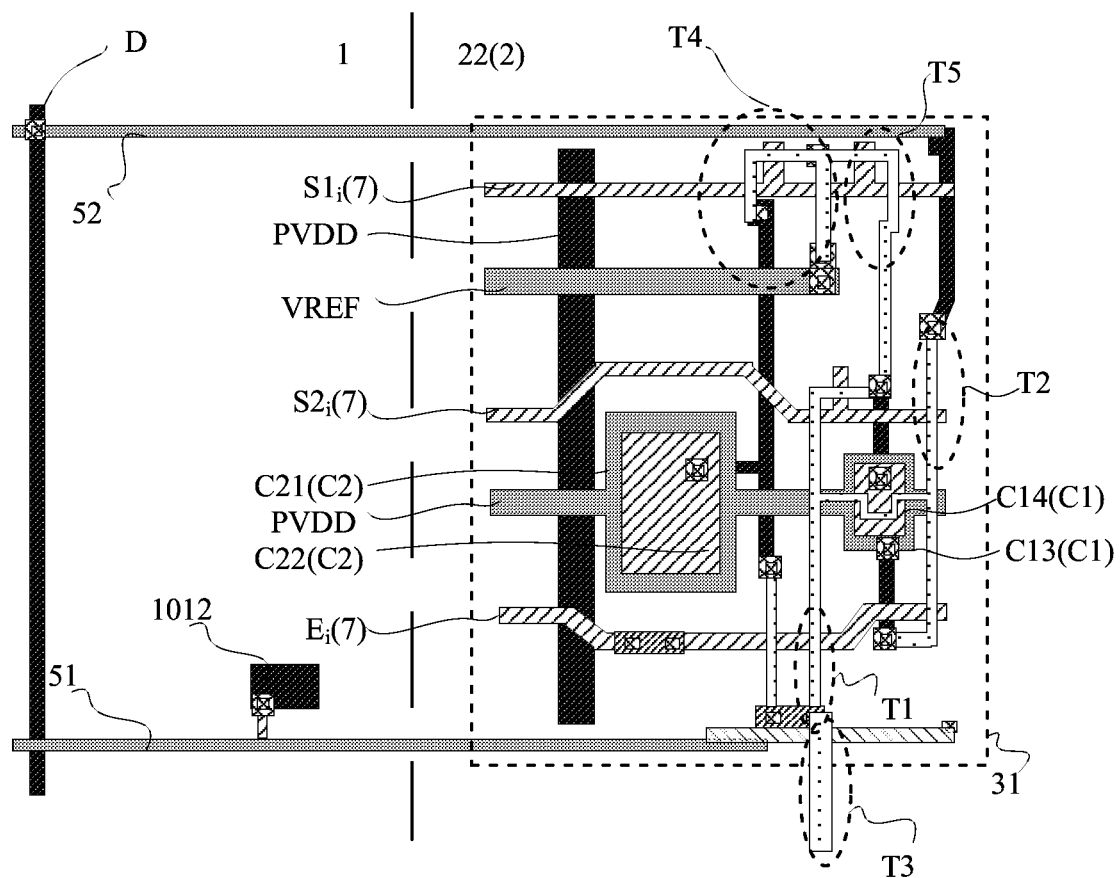
FIG. 6 is a schematic diagram of another wiring of a first pixel driving circuit according to the embodiment of the present disclosure.
Figure 7:
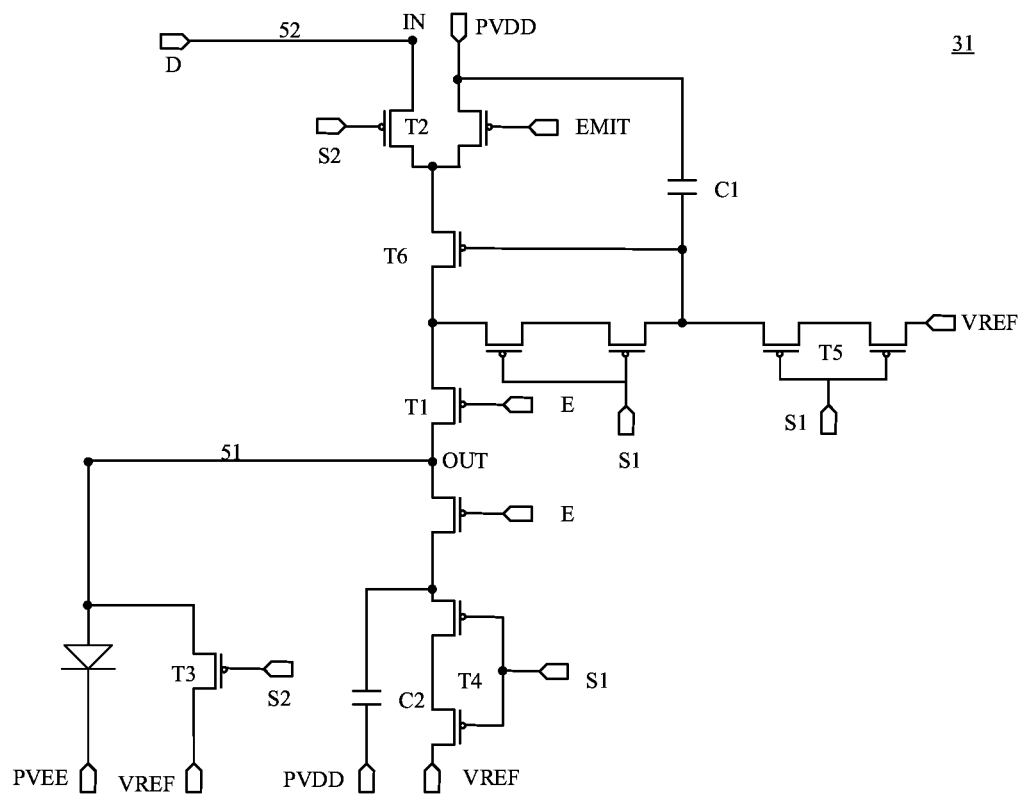
FIG. 7 is an equivalent circuit diagram of the first pixel driving circuit shown in FIG. 5 and FIG. 6.

In an embodiment, as shown in FIGS. 5-7, each of FIG. 5 and FIG. 6 is a schematic diagram of a wiring of a first pixel driving circuit according to an embodiment of the present disclosure, and FIG. 7 is an equivalent circuit diagram of the first pixel driving circuit shown in FIG. 5 and FIG. 6. The plurality of thin film transistors includes a light-emitting control transistor T1, a data writing transistor T2, and an anode initialization transistor T3. Here, a terminal of the light-emitting control transistor T1 is connected to the first display unit 101, a terminal of the anode initialization transistor T3 is also connected to the first display unit 101, and the data writing transistor T2 is connected to a corresponding data line D.

With reference to FIG. 4, the anode 1011 of the first display unit 101 is connected to the light-emitting control transistor T1 and the anode initialization transistor T3 via a through hole 1012. It should be noted that generally the anode constituting the organic light-emitting device is located in a different layer from the data line and the components of the pixel driving circuits. For sake of simplicity, the anode 1011 is not represented by a different filling pattern in FIG. 4, but this does not represent the actual film positional relationship between the anode 1011 and other structures.

In an embodiment, as shown in FIG. 5, the light-emitting control transistor T1, the data writing transistor T2 and the storage capacitor C1 of the first pixel driving circuit 31 can be arranged within the non-display area 2, and the anode initialization transistor T3 can be arranged within the display area 1. In this way, the light-blocking area in the fingerprint recognition region 1 can decrease to some extent, and thus improving the fingerprint recognition accuracy.

In an embodiment, as shown in FIG. 6, the storage capacitor C1 and each of the thin film transistors T of the first pixel driving circuit 31 can be arranged within the non-display area 2, that is, the light-emitting control transistor T1, the data writing transistor T2 and the anode initialization transistor T3 of the first pixel driving circuit 31 are all arranged within the non-display area 2, so as to minimize the light-blocking area in the fingerprint recognition region 11 and thus maximum the amount of light reflected by the fingerprint and received by the fingerprint recognition unit, thereby further improving the fingerprint recognition accuracy.

Figure 8:
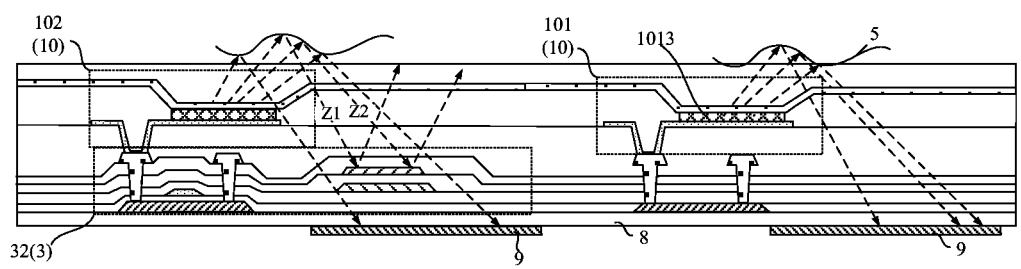
FIG. 8 is a schematic cross-sectional view along line BB' of FIG. 3.

In an example, as shown in FIG. 3 and FIG. 8, which is a schematic cross-sectional view along line BB' of FIG. 3, the display units 10 further include a plurality of second display units 102, and the pixel driving circuits 3 further include a plurality of second pixel driving circuits 32. The plurality of second pixel driving circuits 32 is connected to the plurality of second display units 102 in one-to-one correspondence, and a projection of a second pixel driving circuit 32 on a plane of the display panel at least partially overlaps with a projection of a corresponding second display unit 102 on the plane of the display panel. When the display panel performs display, the second pixel driving circuit 32 drives the second display unit 102 to emit light, and the first pixel driving circuit 31 drives the first display unit 101 to emit light. In addition, since the projection of the second pixel driving circuit 32 on the plane of the display panel at least partially overlaps with the projection of the corresponding second display unit 102 on the plane of the display panel, the second pixel driving circuits 32 can be arranged in accordance with the arrangement of the second display units 102 as much as possible, so that the second pixel driving circuits 32 can be neatly arranged in the display panel, thereby simplifying the number of lines and thus facilitating a compact circuit layout design and achieving high-resolution display.

In an embodiment, as shown in FIGS. 4-7, a terminal of the light-emitting control transistor T1 is connected to the anode 1011 of the first display unit 101 through the first connection line 51, and a terminal of the data writing transistor T2 is connected to the corresponding data line D through the second connection line 52. In this embodiment, by arranging the first pixel driving circuit 31 electrically connected to the first display unit 101 in the non-display area 2, arranging the first connection line 51 to connect the light-emitting control transistor T1 with the anode 1011 of the first display unit 101 and arranging the second connection line 52 to connect the data writing transistor T2 with the corresponding data line D, the first pixel driving circuit 31 moving to the non-display area 2 can still drive the first display unit 101 located within the fingerprint recognition region 11 to emit light normally.

In an example, with further reference to FIG. 4, the display panel further includes a scan driving circuit 6, and a plurality of sets of signal lines 7 extending along the first direction x and arranged along the second direction y. Each set of signal lines 7 is electrically connected to the scan driving circuit 6. Along the first direction x, a first connection line 51 extends from the light-emitting control transistor T1 of the first pixel driving circuit 31 to the first display unit 101, and a second connection line 52 extends from the data writing transistor T2 of the first pixel driving circuit 31 to the data line D corresponding to the first display unit 101. Moreover, projections of the first connection line 51 and the second connection line 52 on the plane of the display panel do not overlap with the projection of any set of signal lines 7 on the plane of the display panel. In this embodiment of the present disclosure, by setting projections of the first connection line 51 and the second connection line 52 on the plane of the display panel to not overlap with the projection of any set of signal lines 7 on the plane of the display panel, that is, by providing the first connection line 51 and the second connection line 52 in a region in the display panel where no signal line 7 is arranged, space in the display panel can be reasonably and effectively utilized, and meanwhile, this can prevent the first connection line 51 and the second connection line 52 from interfering with a signal transmitted in the signal line 7.

In an embodiment, as shown in FIG. 4, the non-display area 2 includes a first non-display area 21 and a second non-display area 22. Along the first direction x, the first non-display area 21, the fingerprint recognition region 11, and the second non-display area 22 are arranged in this order. When the first pixel driving circuit 31 is moved to the non-display area 2, as shown in FIG. 4, according to this embodiment, the scan driving circuit 6 is disposed in the first non-display area 21, and the first pixel driving circuit 31 is disposed the second non-display area 22. That is, in this embodiment, the scan driving circuit 6 and the first pixel driving circuit 31 are disposed separately, and are respectively located within the first non-display area 21 and the second non-display area 22. In such a manner, for example, the present disclosure can avoid that a unilateral frame of the display panel is too wide when the scan driving circuit 6 and the first pixel driving circuit 31 are disposed at a same side of the display panel.

It should be noted that in FIG. 4, sizes of the scan driving circuit 6 and each pixel driving circuit 3 are illustrative, and do not represent the actual size of the scanning driving circuit 6 or the pixel driving circuit 3.

In another embodiment, in addition to the case shown in FIG. 4, the scan driving circuit 6 can be arranged within the second non-display area 22, and the first pixel driving circuit 31 can be arranged within the first non-display area 21, so that the scan driving circuit 6 and the first pixel driving circuit 31 can be provided separately.

In an embodiment, a specific location of the first pixel driving circuit 31 in the non-display area 2 can be selected in the following manner.

Along the first direction x, a distance between the first display unit 101 and the first non-display area 21 is d1, and a distance between the first display unit 101 and the second non-display area 22 is d2. when d1<d2, the first pixel driving circuit 31 corresponding to the first display unit 101 is arranged within the first non-display area 21, and the scan driving circuit 6 is arranged within the second non-display area 22.

When d2<d1, the first pixel driving circuit 31 corresponding to the first display unit 101 is arranged within the second non-display area 22, and the scan driving circuit 6 is arranged within the first non-display area 21. That is, in this embodiment, when the first pixel driving circuit 31 is moved to the non-display area 2, the first pixel driving circuit 31 is moved to a part of the non-display area that is close to the first display unit 101, so as to shorten a wiring length of the first connection line 51 and/or the second connection line 52.

In an example, as shown in FIG. 4, when d2<d1, the first pixel driving circuit 31 is arranged within the second non-display area 22, and the scan driving circuit 6 is arranged within the first non-display area 21.

Figure 9:
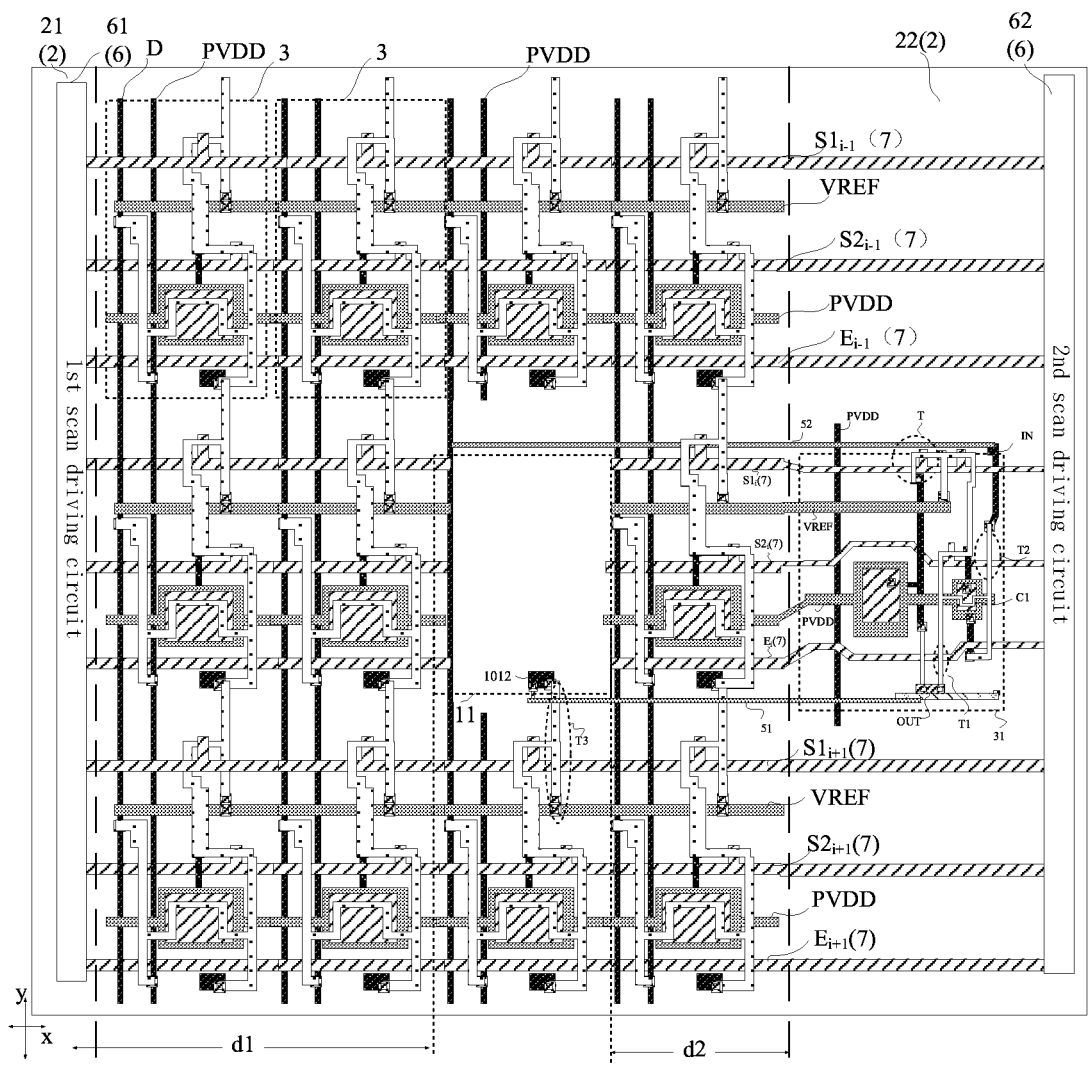
FIG. 9 is an enlarged schematic diagram of a partial region of another display panel according to the embodiment of the present disclosure.

In an example, as shown in FIG. 9, which is an enlarged schematic diagram of a partial region of another display panel according to the embodiment of the present disclosure, the scan driving circuits 6 include a first scan driving circuit 61 and a second scan driving circuit 62. The first scan driving circuit 61 is arranged within the first non-display area 21, and the second scan driving circuit 62 is arranged within the second non-display area 22. Each set of signal lines 7 extends along the first direction x, and each set of signal lines 7 breaks at a position corresponding to the first display unit 101. In this embodiment of the present disclosure, the first scan driving circuit 61 and the second scan driving circuit 62 are respectively arranged within the first non-display area 21 and the second non-display area 22, so that in the actual operation of the display panel, for example, a bilateral driving manner can be adopted in which the first scan driving circuit 61 can drive display units 10 located in the odd-numbered row(s) and the second scan driving circuit 62 can drive display units 10 located in the even-numbered row(s). Based on this driving manner, each set of signal lines 7 may break at the position corresponding to the first display unit 101, that is, no signal line 7 is provided at the position corresponding to the first display unit 101. Thus, the second display unit 102 located at a side of the first display unit 101 close to the first non-display area 21 is driven by the first scan driving circuit 61, and the second display unit 102 located at a side of the first display unit 101 close to the second non-display area 22 is driven by the second scan driving circuit 62. With such an arrangement, the amount of opaque components at the position corresponding to the first display unit 101 can be further decreased and the transmission area of light can be increased, thereby improving the fingerprint recognition accuracy. In addition, after the first pixel driving circuit 31 is moved to the first non-display area 21 or the second non-display area 22, the signal line 7 may extend toward the first non-display area 21 or the second non-display area 22, so as to provide a signal to the moved first pixel driving circuit 31. This solution is easy to be implemented, and there is no need for an additional connection line connecting the first pixel driving circuit 31 with the signal line 7 located within the display area 1, thereby avoiding an increase in the amount of lines and the complication of the circuit.

It should be understood that the first display unit 101 can be any one of the plurality of display units 10 included in the display panel. For example, as shown in FIG. 4, the first display unit 101 can be the display unit 10 located at an $i^{th}$ row and a $j^{th}$ column, where i and j are both positive integers not smaller than 2.

As shown in FIG. 4, each set of signal lines 7 includes a first scan signal line S1, a second scan signal line S2, and a light-emitting signal line E which are sequentially arranged along the second direction y. Here, a projection of the first connection line 51 on the plane of the display panel is located between a projection of the $(i+1)^{th}$ first scan signal line $S1_{i+1}$ on the plane of the display panel and the a projection of the $i^{th}$ light-emitting signal line $E_i$ on the plane of the display panel, and a projection of the second connection line 52 on the plane of the display panel is located between a projection of the $i^t$ first scan signal line $S1_i$ on the plane of the display panel and a projection of the $(i-1)^{th}$ light-emitting signal line $E_{i-1}$ on the plane of the display panel. Space between two adjacent rows of pixel driving circuits 3 is larger than other positions in the display panel. Therefore, the first connection line 51 and the second connection line 52 can be disposed at positions in the display panel with large space. This can not only reasonably and effectively utilize the space in the display panel, but also prevent the first connection line 51 and the second connection line 52 from influencing the original wiring in the display panel.

In an example, as shown in FIG. 9, the display panel further includes power signal lines PVDD and reference voltage signal lines VREF. The reference voltage signal lines VREF extend along the first direction x and are arranged along the second direction y. The power signal lines PVDD are distributed in a grid in the display panel, and the power signal lines PVDD break at the position corresponding to the first display units. That is, in this embodiment, the power signal line corresponding to the first display unit is also moved to the non-display area so as to further decrease the light-blocking area in the fingerprint recognition region and increase the light transmission area, thereby improving the fingerprint recognition accuracy. In an example, the gate electrode of the anode initialization transistor T3 of the first pixel driving circuit 31 is connected to the $(i+1)^{th}$ first scan signal line $S1_{i+1}$; and another terminal of the anode initialization transistor T3 is connected to the reference voltage signal line VREF.

With further reference to FIG. 5, FIG. 6, and FIG. 7, the first pixel driving circuit 31 further includes a stabilization capacitor C2 located within the non-display area 2, and the stabilization capacitor C2 includes a first electrode plate C21 and a second electrode plate C22. The first electrode plate C21 is connected to the power signal line PVDD, and the second electrode plate C22 is connected to the reference voltage signal line VREF. In this embodiment of the present disclosure, the first pixel driving circuit 31 is moved to the non-display area 2, the space in the non-display area 2 is larger than the space in the display area 1 in which the plurality of second pixel driving circuits 32 are provided. Therefore, by providing a stabilization capacitor C2 in the first pixel driving circuit 31 located within the non-display area 2 and connecting the two electrode plates of the stabilization capacitor C2 to the power signal line and the reference voltage signal line VREF, respectively, the signal in the first connection line 51 can be stabilized by means of the capacitor C2, thereby avoiding an unstable signal in the first connection line 51 due to jumping of the signal in the data line D when the first connection line 51 is connected to the first display unit 101 located within the display area 1 by crossing data lines D and thus achieving the stable display of the first display unit 101.

In an example, as shown in FIG. 5 and FIG. 6, the storage capacitor C1 includes a third electrode plate C13 and a fourth electrode plate C14. The first electrode plate C21 and the third electrode plate C13 are disposed in a same layer, and the second electrode plate C22 and the fourth electrode plate C14 are disposed in a same layer. In this embodiment of the present disclosure, the first electrode plate C21 and the third electrode plate C13 are disposed in the same layer, and the second electrode plate C22 and the fourth electrode plate C14 are disposed in the same layer. In this way, the first electrode plate C21, the third electrode plate C13, the second electrode plate C22 and the fourth electrode plate C14 can be manufactured by two processes in the manufacturing process of the display panel, and there is no need to additionally provide a new process for manufacturing the stabilization capacitor C2.

In an example, the first connection line 51, the second connection line 52, and the third electrode plate C13 of the storage capacitor C1 are disposed in a same layer. In the respective film layers of the existing display panel, the amount of lines in the film layer of the third electrode plate C13 of the storage capacitor C1 is small. In this embodiment, the first connection line 51, the second connection line 52 and the third electrode plate C13 of the storage capacitor C1 are disposed in the same layer. This can not only reasonably and effectively utilize the existing space in the display panel, but also prevent the first connection line 51 and the second connection line 52 from influencing the original wiring in the display panel.

In an example, as shown in FIG. 5, FIG. 6 and FIG. 7, the first pixel driving circuit 31 further includes a capacitor initialization transistor T4 and a gate initialization transistor T5. The capacitor initialization transistor T4 includes a gate electrode connected to the first scan signal line S1, a first electrode connected to the reference voltage signal line VREF, and a second electrode connected to the second electrode plate C22 of the stabilization capacitor C2. The gate electrode of the gate initialization transistor T5 is connected to the first scan signal line 51, so that the signal transmitted through the reference voltage signal line VREF causes, under the action of the first scan signal transmitted in the first scan signal line, the capacitor initialization transistor T4 and the gate initialization transistor T5 to control a corresponding node to perform a voltage reset.

Figure 10:
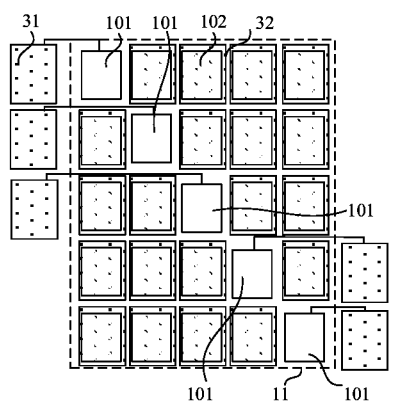
FIG. 10 is an enlarged schematic diagram of a partial region of still another display panel according to the embodiment of the present disclosure.
Figure 11:
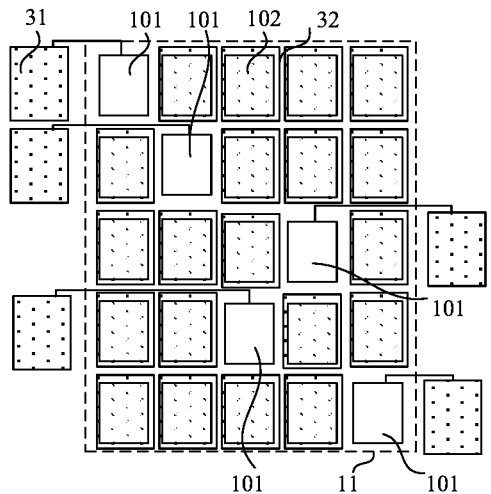
FIG. 11 is an enlarged schematic diagram of a partial region of still another display panel according to the embodiment of the present disclosure.

In an example, there may be various distribution manners with respect to the first display unit(s) 101 in the fingerprint recognition region 11. For example, in the abovementioned display units 10, at least one row of display units 10 includes one first display unit 101. As shown in FIG. 10 and FIG. 11, each of FIG. 10 and FIG. 11 is an enlarged schematic diagram of a partial region of still another display panel according to the embodiment of the present disclosure. Within the fingerprint recognition region 11, each row of display units 10 includes a first display unit 101, and first display units 101 in different rows of display units 10 are located in different columns. According to this embodiment of the present disclosure and in combination with the abovementioned bilateral driving manner, it is possible that no scan signal line is provided at the position corresponding to each first display unit 101, thereby further increasing the light transmission area in the fingerprint recognition region and improving the fingerprint recognition accuracy. Moreover, after the data line D located within the display area 1 is connected to the first pixel driving circuit 31 located within the non-display area 2 through the second connection line 52, the load on the corresponding data line D increases. Thus, in this embodiment, the first display units 101 in different rows of display units 10 are located in different columns, that is, the pixel driving circuits of the display units 10 located in different columns are moved to the non-display area 2. Thus, the increased load can be dispersed to a plurality of data lines D corresponding to a plurality of columns of display units 10, so that display unevenness caused by the excessive load increase on one of the data lines can be avoided.

Figure 12:
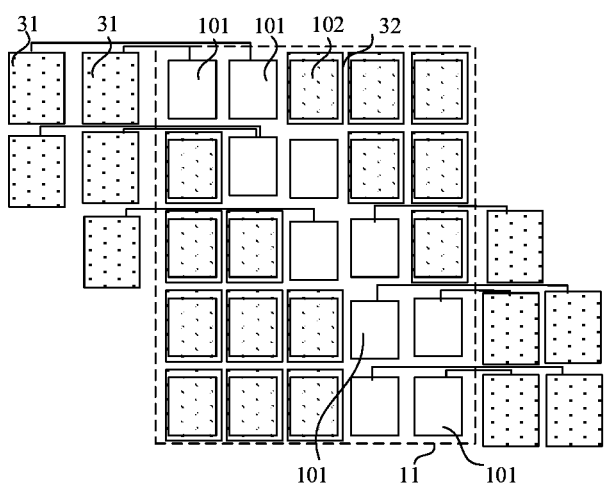
FIG. 12 is an enlarged schematic diagram of a partial region of still another display panel according to the embodiment of the present disclosure.

In another embodiment, as shown in FIG. 12, which is an enlarged schematic diagram of a partial region of still another display panel according to the embodiment of the present disclosure, each row of display units 10 includes at least two adjacent first display units 101. According to this embodiment of the present disclosure and in combination with the abovementioned bilateral driving manner, it is possible that no scan signal line is provided at the position corresponding to each first display unit 101, thereby further increasing the light transmission area in the fingerprint recognition region and improving the fingerprint recognition accuracy. Moreover, there is no need for an additional connection line connecting the first pixel driving circuit 31 with the signal line located within the display area 1, thereby avoiding an increase in the amount of lines and the complication of the circuit.

In an embodiment, as shown in FIG. 8, the display panel further includes a base substrate 8, a fingerprint recognition light source, and a fingerprint recognition unit 9, and the fingerprint recognition unit 9 is disposed on a side of the base substrate 8 away from the light-out side of the display panel. For example, the first display unit 101 includes a light-emitting layer 1013, which can be reused as a fingerprint recognition light source. In the fingerprint recognition process, light emitted from the light-emitting layer 1013 of the first display unit 101 reaches the touching body 5 and then is the reflected by the touching body 5, and then the reflected light is transmitted to the fingerprint recognition unit 9, which in turn determines valley(s) and ridge(s) of the fingerprint according to the light intensity so as to recognize the fingerprint.

Figure 13:
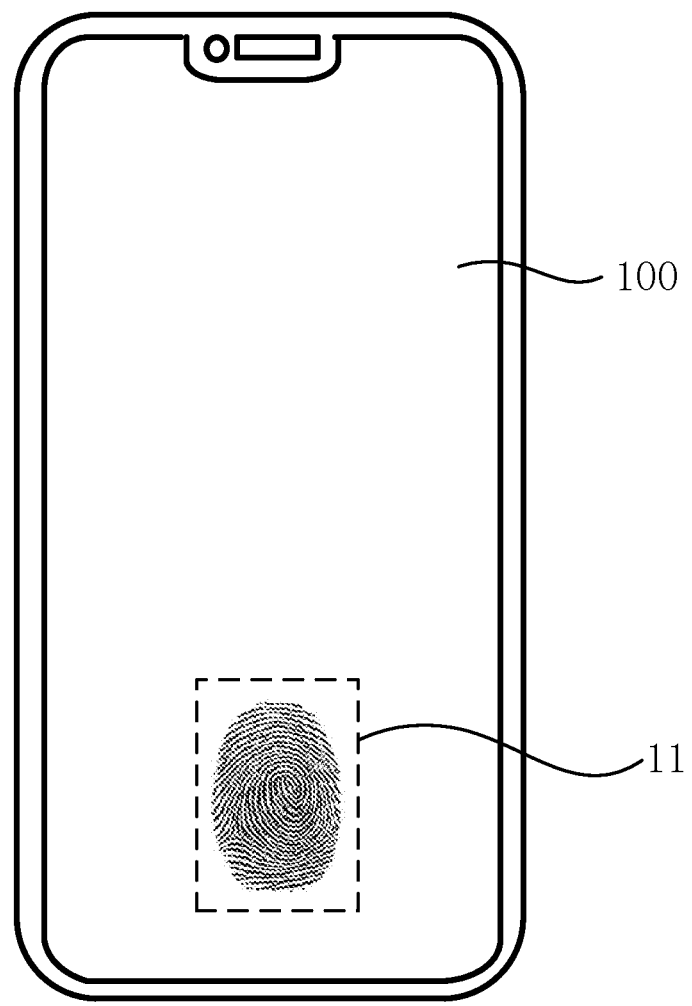
FIG. 13 is a schematic diagram of a display device according to an embodiment of the present disclosure.

The present disclosure further provides a display device. As shown in FIG. 13, which is a schematic diagram of a display device according to an embodiment of the present disclosure, the display device includes the abovementioned display panel 100, and the display panel 100 includes a fingerprint recognition region 11. The structure of the display panel 100 has been described in detail in the above embodiments and will not be further described herein. It should be noted that the display device shown in FIG. 13 is merely illustrative, and the display device can be any electronic device having a display function, such as a cellphone, a tablet computer, a notebook computer, an electronic paper book, a TV, etc.

With the display device provided by the present disclosure, the storage capacitor and/or at least one thin film transistor T of the first pixel driving circuit 31 electrically connected to the first display unit 101 are arranged in the non-display area 2, and the first display unit 101 is arranged in the fingerprint recognition region 11. That is, compared with the related art, in this embodiment of the present disclosure, at least partial components of the first pixel driving circuit 31 are moved from the fingerprint recognition region 11 to the non-display area 2. In this way, the light-blocking area in the fingerprint recognition region will be decreased, and thus in the fingerprint recognition process, a reduced amount of light reflected by the fingerprint will be blocked on its way to the fingerprint recognition unit. Therefore, compared with the related art, with the display device provided by the present disclosure, the amount of light that is blocked in the fingerprint recognition process and thus cannot get into the fingerprint recognition unit can be decreased to some extent, and thus the amount of light received by the fingerprint recognition unit can be increased, thereby improving the fingerprint recognition accuracy.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A display panel, wherein the display panel has a display area and a non-display area, the display panel comprising:
    a plurality of display units arranged in an array within the display area; and
    a plurality of pixel driving circuits, each of which is connected to a respective one of the plurality of display units,
    wherein the display area comprises a fingerprint recognition region; at least one of the plurality of display units is disposed within the fingerprint recognition region and comprises at least one first display unit; and the plurality of pixel driving circuits comprises at least one first pixel driving circuit electrically connected to the at least one first display unit; each of the at least one first pixel driving circuit comprises a storage capacitor and a plurality of thin film transistors, and the storage capacitor and/or at least one of the plurality of thin film transistors are located within the non-display area,
    wherein the display panel further comprises a plurality of data lines arranged along a first direction and extending along a second direction, the first direction is different from the second direction; each of the plurality of data lines is electrically connected to pixel driving circuits of the plurality of pixel driving circuits corresponding to a respective one column of display units of the plurality of display units, and wherein the plurality of thin film transistors comprises a light-emitting control transistor, a data writing transistor, and an anode initialization transistor; a terminal of the light-emitting control transistor is connected to the at least one first display unit; a terminal of the anode initialization transistor is connected to the at least one first display unit; and the data writing transistor is connected to a corresponding data line of the plurality of data lines.

2. The display panel according to claim 1, wherein the light-emitting control transistor, the data writing transistor, and the storage capacitor are located within the non-display area; and the anode initialization transistor is located within the display area.

3. The display panel according to claim 1, wherein the storage capacitor and each of the plurality of thin film transistors are located within the non-display area.

4. The display panel according to claim 1, wherein the plurality of display units further comprises a plurality of second display units; the plurality of pixel driving circuits further comprises a plurality of second pixel driving circuits; the plurality of second pixel driving circuits are connected to the plurality of second display units in one-to-one correspondence, and projections of the plurality of second pixel driving circuits on a plane of the display panel at least partially overlap with projections of the plurality of second display units on the plane of the display panel.

5. The display panel according to claim 4, wherein the terminal of the light-emitting control transistor is connected to the at least one first display unit through a first connection line; and a terminal of the data writing transistor is connected to the corresponding data line through a second connection line.

6. The display panel according to claim 5, further comprising: at least one scan driving circuit; and a plurality of sets of signal lines arranged along the second direction and extending along the first direction; each set of the plurality of sets of signal lines is electrically connected to the at least one scan driving circuit, and projections of the first connection line and the second connection line on the plane of the display panel do not overlap with a projection of the set of signal lines on the plane of the display panel;

wherein the non-display area comprises a first non-display area and a second non-display area;

wherein the first non-display area, the fingerprint recognition region, and the second non-display area are sequentially arranged along the first direction; and wherein along the first direction, the first connection line extends from the light-emitting control transistor of the at least one first pixel driving circuit to the at least one first display unit; the second connection line extends from the data writing transistor of the at least one first pixel driving circuit to a corresponding data line of the at least one first display unit.

7. The display panel according to claim 6, wherein the at least one scan driving circuit is located within the first non-display area and the at least one first pixel driving circuit is located within the second non-display area, or the at least one scan driving circuit is located within the second non-display area and the at least one first pixel driving circuit is located within the first non-display area.

8. The display panel according to claim 7, wherein a distance between the at least one first display unit and the first non-display area along the first direction is d1, and a distance between the first display unit and the second non-display area along the first direction is d2;

wherein when d1<d2, the at least one first pixel driving circuit corresponding to the at least one first display unit is located within the first non-display area, and the at least one scan driving circuit is located within the second non-display area; and wherein when d2<d1, the at least one first pixel driving circuit corresponding to the at least one first display unit is located within the second non-display area, and the at least one scan driving circuit is located within the first non-display area.

9. The display panel according to claim 6, wherein the at least one scan driving circuit comprises a first scan driving circuit and a second scan driving circuit; wherein the first scan driving circuit is located within the first non-display area and the second scan driving circuit is located within the second non-display area;

wherein each set of the plurality sets of signal lines extends along the first direction, and each set of the plurality sets of signal lines breaks at a position corresponding to the at least one first display unit.

10. The display panel according to claim 9, wherein the at least one first display unit comprise a display unit located at an $i^{th}$ row and a $j^{th}$ column, and an $i^{th}$ set of the plurality of sets of signal lines is electrically connected to the at least one first pixel driving circuit, wherein both i and j are positive integers larger than or equal to 2;

wherein each set of the plurality of sets of signal lines comprises a first scan signal line, a second scan signal line, and a light-emitting signal line that are sequentially arranged along the second direction; and wherein a projection of the first connection line on the plane of the display panel is between a projection of an $(i+1)^{th}$ first scan signal line and a projection of an $i^{th}$ light-emitting signal line on the plane of the display panel, a projection of the second connection line on the plane of the display panel is between a projection of an $i^{th}$ first scan signal line and a projection of an $(i-1)^{th}$ light-emitting signal line on the plane of the display panel.

11. The display panel according to claim 10, further comprising a power signal line and a reference voltage signal line;

wherein the anode initialization transistor of the first pixel driving circuit comprises a gate electrode connected to the $(i+1)^{th}$ first scan signal line; and another terminal of the anode initialization transistor is connected to the reference voltage signal line; and wherein the at least one first pixel driving circuit further comprises a stabilization capacitor located within the non-display area, and the stabilization capacitor comprises a first electrode plate and a second electrode plate; the first electrode plate is connected to the power signal line, and the second electrode plate is connected to the reference voltage signal line.

12. The display panel according to claim 11, wherein the storage capacitor comprises a third electrode plate and a fourth electrode plate; the first electrode plate and the third electrode plate are located in a same layer, and the second electrode plate and the fourth electrode plate are located in a same layer.

13. The display panel according to claim 12, wherein the first connection line, the second connection line, and the third electrode plate of the storage capacitor are located in a same layer.

14. The display panel according to claim 11, wherein each of the at least one first pixel driving circuit further comprises a capacitance initialization transistor; the capacitance initialization transistor comprises a gate electrode connected to the first scan signal line, a first electrode connected to the reference voltage signal line, and a second electrode connected to the second electrode plate of the stabilization capacitor.

15. The display panel according to claim 1, wherein at least one row of display units of the plurality of display units comprises the at least one first display unit.

16. The display panel according to claim 15, wherein within the fingerprint recognition region, each row of display units of the plurality of display units comprises one of the at least one first display unit, and first display units in different rows of display units are located in different columns.

17. The display panel according to claim 15, wherein each row of display units comprises at least two adjacent first display units.

18. The display panel according to claim 1, further comprising a base substrate, a fingerprint recognition light source, and a fingerprint recognition unit, wherein the fingerprint recognition unit is disposed on a side of the base substrate away from a light-out side of the display panel.

19. A display device, comprising a display panel having a display area and a non-display area, wherein the display panel comprises:

a plurality of display units arranged in an array within the display area; and a plurality of pixel driving circuits, each of which is connected to a respective one of the plurality of display units, wherein the display area comprises a fingerprint recognition region; at least one of the plurality of display units is disposed within the fingerprint recognition region and comprises at least one first display unit; and the plurality of pixel driving circuits comprises at least one first pixel driving circuit electrically connected to the at least one first display unit; each of the at least one first pixel driving circuit comprises a storage capacitor and a plurality of thin film transistors, and the storage capacitor and/or at least one of the plurality of thin film transistors are located within the non-display area, wherein the display panel further comprises a plurality of data lines arranged along a first direction and extending along a second direction, the first direction is different from the second direction; each of the plurality of data lines is electrically connected to pixel driving circuits of the plurality of pixel driving circuits corresponding to a respective one column of display units of the plurality of display units, and wherein the plurality of thin film transistors comprises a light-emitting control transistor, a data writing transistor, and an anode initialization transistor; a terminal of the light-emitting control transistor is connected to the at least one first display unit a terminal of the anode initialization transistor is connected to the at least one first display unit and the data writing transistor is connected to a corresponding data line of the plurality of data lines.

\* \* \* \* \*